UNITED STATES PATENT OFFICE.

EDWIN B. S. SHOEMAKER, OF TOWSONTOWN, MARYLAND.

IMPROVEMENT IN THE MANUFACTURE OF LUBRICATING COMPOUNDS.

Specification forming part of Letters Patent No. 105,499, dated July 19, 1870.

*To all whom it may concern:*

Be it known that I, EDWIN B. S. SHOEMAKER, of Towsontown, in the county of Baltimore and State of Maryland, have invented a new and Improved Lubricator; and I do hereby declare that the following is a full, clear, and exact description thereof.

My object is to produce a lubricator which is adapted for axles or journals of all kinds, by combining with sperm-oil a substance which will form with it a homogeneous compound, that will retain the consistency given to it under all ordinary temperatures, and afford a smooth anti-friction surface to any object to which it may be applied.

The following description will enable others skilled in the art to make and use my improved lubricator.

I take sperm-oil, eight (8) parts, and india-rubber, about six (6) parts, and proceed as follows: Put the oil and india-rubber into an iron or other suitable vessel, and apply heat until the india-rubber is completely dissolved in the oil. These two substances, properly united, say at a temperature of about 400° Fahrenheit, will make an excellent lubricator. I, however, prefer to add to the above mixture, while warm, the following ingredients: tallow, four parts; black-lead, one part; and soda, two parts. The whole is then passed through a mill, in order to thoroughly mix and incorporate the ingredients.

The sperm-oil, tallow, and black-lead are of themselves good lubricators, and when mixed together in about the proportions above given their lubricating properties are greatly augmented.

The india-rubber, which, I have discovered, can be readily dissolved in sperm-oil at a temperature of 400° Fahrenheit, or even less, is used for the purpose of giving a body to the oil or other ingredients, and adding to the lubricating properties thereof, and also giving thereto adhesiveness, which prevents the oil wasting from the axles or journals.

When the lubricator is made from the above formula it will be of the consistency of lard; but it may be prepared to adapt it for any climate, or any use for which it may be desired, by changing the relative proportions of one or more of the ingredients.

While I prefer to employ, in combination with the india-rubber and the sperm-oil, tallow, black-lead, and soda, I do not confine myself thereto, as the india-rubber and oil may be used either alone or with either one or more of the substances.

Having described my invention, what I claim as new, and desire to secure by Letters Patent, is—

A lubricator for axles, journals, and other purposes, composed of the ingredients, mixed substantially as described.

EDWIN B. S. SHOEMAKER.

Witnesses:
    W. S. SHOEMAKER,
    JAMES MILLER.